(12) United States Patent
Byrnes

(10) Patent No.: US 8,925,944 B2
(45) Date of Patent: Jan. 6, 2015

(54) CONTROL ARM WITH SOCKET

(71) Applicant: Federal-Mogul Products, Inc., Southfield, MI (US)

(72) Inventor: Thomas J. Byrnes, St. Charles, MO (US)

(73) Assignee: Federal-Mogul Products, Inc., Southfield, MI (US)

( * ) Notice: Subject to any disclaimer, the term of this patent is extended or adjusted under 35 U.S.C. 154(b) by 0 days.

(21) Appl. No.: 13/804,571

(22) Filed: Mar. 14, 2013

(65) Prior Publication Data

US 2013/0328284 A1   Dec. 12, 2013

Related U.S. Application Data

(60) Provisional application No. 61/656,094, filed on Jun. 6, 2012.

(51) Int. Cl.
 *B60G 3/04* (2006.01)

(52) U.S. Cl.
 USPC .................................................. 280/124.134

(58) Field of Classification Search
 USPC ................... 280/124.134, 124.151, 124.153; 403/131–133, 136, 138, 144; 29/451, 29/453; 384/206, 208, 209
 See application file for complete search history.

(56) References Cited

U.S. PATENT DOCUMENTS

| 3,317,256 | A | 5/1967 | Ernest |
| 4,447,094 | A | 5/1984 | Trudeau et al. |
| 4,714,368 | A | 12/1987 | Sawada et al. |
| 4,718,780 | A | 1/1988 | Trudeau |
| 4,880,329 | A | 11/1989 | Sakai |
| 5,033,872 | A | 7/1991 | Ueno et al. |
| 5,230,580 | A | 7/1993 | Henkel |
| 5,242,228 | A | 9/1993 | Hattori |
| 5,284,398 | A | 2/1994 | Sakai |
| 5,407,288 | A | 4/1995 | Watanabe |

(Continued)

FOREIGN PATENT DOCUMENTS

| FR | 2562967 A1 | 10/1985 |
| JP | 01126414 A | 5/1989 |

(Continued)

OTHER PUBLICATIONS

International Search Report, mailed Jun. 20, 2013 (PCT/US2013/031827).

*Primary Examiner* — Faye M. Fleming
(74) *Attorney, Agent, or Firm* — Robert L. Stearns; Dickinson Wright, PLLC

(57) ABSTRACT

A control arm for a vehicle suspension is provided. The control arm includes a control arm body having a connector for attachment to a wheel assembly, a horizontal bushing for coupling the control arm with a vehicle frame and a vertical socket for also coupling the control arm with a vehicle frame. The vertical socket has a housing which is press fit into an opening of the control arm body and a stud which extends through the housing for engagement with the vehicle frame. A bearing is positioned within the housing between the housing and the stud. The stud has a rounded outer surface, and the bearing has a rounded inner surface for allowing rotational movement of the bearing and housing relative to the stud. A retainer member is in engagement with the housing and the bearing for retaining the bearing in the inner bore of the housing.

11 Claims, 11 Drawing Sheets

(56) References Cited

U.S. PATENT DOCUMENTS

| | | |
|---|---|---|
| 5,477,614 A | 12/1995 | Watanabe |
| 5,480,231 A | 1/1996 | Sasaki et al. |
| 5,931,597 A | 8/1999 | Urbach |
| 5,993,065 A | 11/1999 | Ladzinski et al. |
| 6,685,377 B2 | 2/2004 | Nakata et al. |
| 6,692,179 B2 | 2/2004 | Bohne et al. |
| 6,698,963 B1 | 3/2004 | Parker et al. |
| 6,913,410 B2 | 7/2005 | Blanke |
| 7,293,787 B2 * | 11/2007 | Nunez et al. ............ 280/124.134 |
| 7,357,591 B2 | 4/2008 | Broker et al. |
| 7,438,493 B2 | 10/2008 | Holmes et al. |
| 7,654,766 B2 | 2/2010 | Zuge et al. |
| 8,282,305 B2 * | 10/2012 | Rechtien et al. ............... 403/131 |
| 2002/0031395 A1 | 3/2002 | Kim |
| 2007/0122232 A1 | 5/2007 | Buchner et al. |
| 2007/0212165 A1 | 9/2007 | Rechtien et al. |
| 2010/0054851 A1 | 3/2010 | Bohne et al. |
| 2012/0007329 A1 * | 1/2012 | Hopson et al. ......... 280/124.134 |

FOREIGN PATENT DOCUMENTS

| | | |
|---|---|---|
| JP | 01126415 A | 5/1989 |
| JP | 01126416 A | 5/1989 |
| JP | 02195013 A | 8/1990 |
| JP | 04025609 A | 1/1992 |
| JP | 04025610 A | 1/1992 |
| JP | 06235417 A | 8/1994 |

* cited by examiner

US 8,925,944 B2

CONTROL ARM WITH SOCKET

CROSS REFERENCE TO RELATED APPLICATION

This application claims the benefit of application Ser. No. 61/656,094 filed on Jun. 4, 2012.

BACKGROUND OF THE INVENTION

1. Field of the Invention

This invention relates generally to control arms and to methods of making the same.

2. Related Art

Many automotive vehicles today employ suspension systems commonly known as MacPherson strut systems or double-wishbone systems. Such systems typically include a lower control arm (also referred to as an A-arm) which pivots relative to the vehicle's frame to allow a wheel and tire to move upwardly and downwardly relative to the frame during cornering or in response to encountering an object, such as a pot hole in the road.

A lower control arm 10 for a Macpherson strut type of suspension system is generally shown in FIG. 1. The lower control arm 10 includes a ball joint 12 for connection with a steering knuckle (not shown) of a hub assembly and a pair of bushings 14, 16 for guiding the pivoting movement of the lower control arm 10 relative to the vehicle's frame (not shown). One of the bushings is a horizontal bushing 14 which is configured to pivot relative to the vehicle frame about longitudinally extending bolt (not shown). The other bushing 16 is a vertical bushing which is configured to pivot relative to the vehicle frame about a vertically extending bolt (not shown).

Referring now to FIGS. 2A-C, an conventional vertical bushing 16 is generally shown. As best shown in FIG. 2C, the conventional vertical bushing 16 has an outer metallic sleeve 18, which is press fit into an opening in the lower control arm 10, a rubber cushion 20 and an inner metallic sleeve 22. The rubber cushion 20 extends radially between and interconnects the outer and inner metallic sleeves 18, 22. In operation, the inner metallic sleeve 22 pivots or twists relative to the outer metallic sleeve 18 during movement of the vehicle suspension, such as when the vehicle encounters a pot hole in the road. The rubber cushion 20 deforms elastically to allow the pivoting movement between these sleeves 18, 22 and absorbs/deforms due to a radial load. As such, during operation of the vehicle, the rubber cushion 20 is exposed to both a radial load and a twisting load motion. Exposure to the radial load and twisting motion leads to deterioration in the rubber cushion 20, thereby reducing the life of the vertical bushing 16.

SUMMARY OF THE INVENTION

An aspect of the present invention provides for an improved control arm for a vehicle suspension which will have improved durability and provides a longer life than other known control arms. The control arm includes a control arm body with a connector for attachment to a wheel assembly a horizontal bushing that extends in a longitudinal direction for coupling the control arm body with a vehicle frame and a vertical socket that extends in a vertical direction for also coupling the control arm body with a vehicle frame. A housing is press fit into an opening in the control arm body. The housing extends along a vertical axis between first and second open ends and has an inner bore which extends between the open ends. A bearing is disposed within the inner bore of the housing, and the bearing has a curved inner surface. A retainer member is in engagement with the housing and the bearing and retains the bearing within the inner bore of the housing. A stud extends through the inner bore of the housing and past the open first and second ends for engaging the vehicle frame on opposite sides of the housing. The stud has a curved outer surface which is in sliding engagement with the curved inner surface of the bearing for allowing rotational movement of the housing and the control arm body relative to the stud and the vehicle frame. In operation, rotational movement of the housing and control arm body relative to the stud does little to no damage to the vertical socket, thus providing the control arm with improved durability and operating life.

BRIEF DESCRIPTION OF THE DRAWINGS

These and other features and advantages of the present invention will be readily appreciated, as the same becomes better understood by reference to the following detailed description when considered in connection with the accompanying drawings wherein.

DESCRIPTION OF THE ENABLING EMBODIMENT

Figure 1:
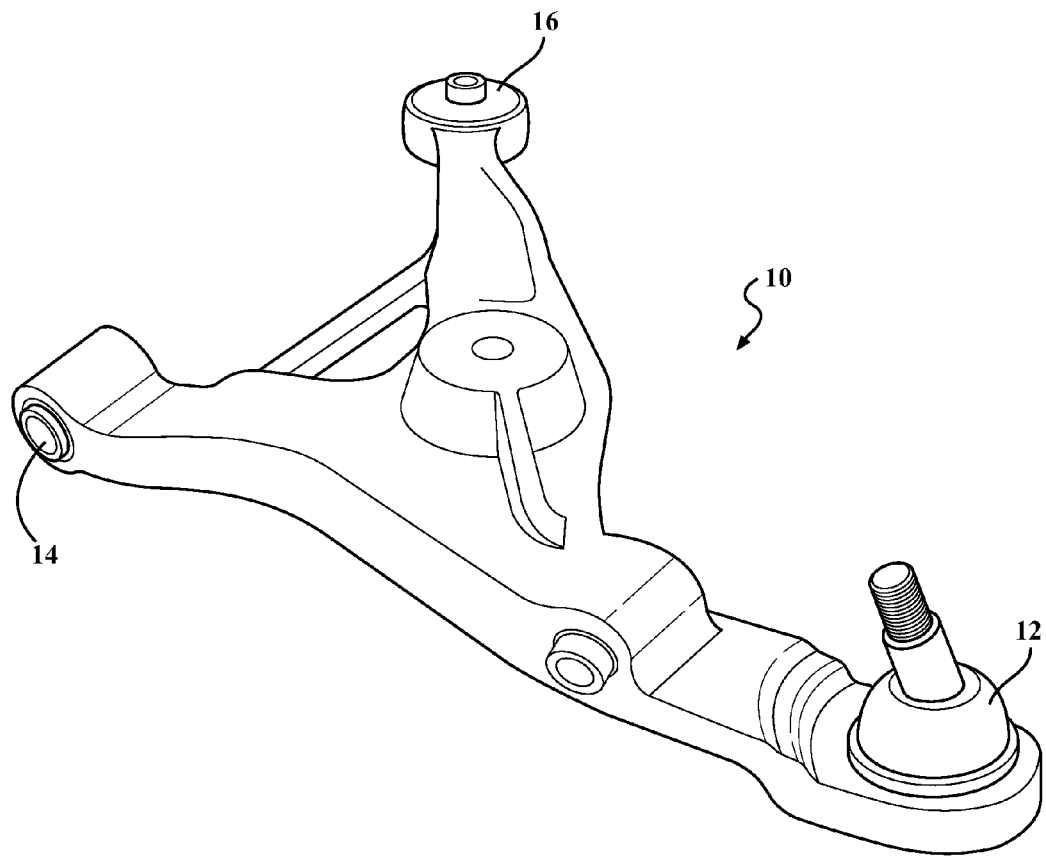
FIG. 1 is a perspective elevation view of an conventional control arm with a conventional vertical bushing.
Figure 2A:
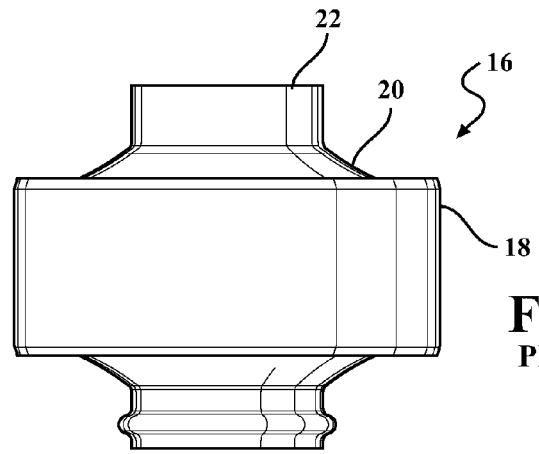
FIG. 2A is a perspective view of the conventional vertical bushing of FIG. 1.
Figure 2B:
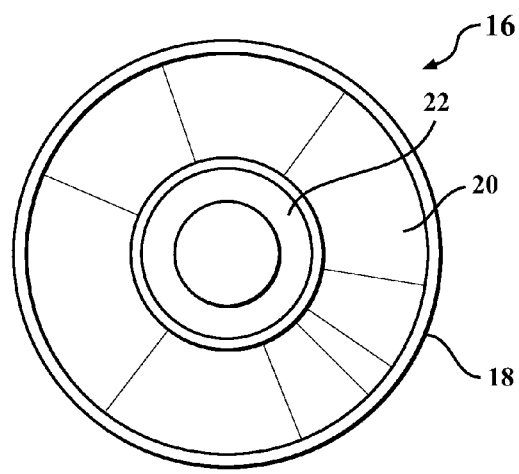
FIG. 2B is a top view of the conventional vertical bushing of FIG. 1.
Figure 2C:
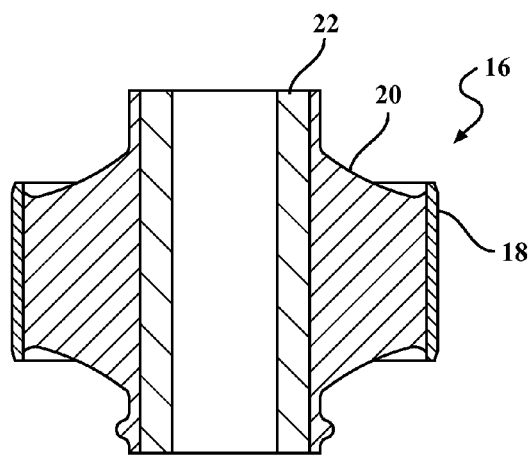
FIG. 2C is a cross-sectional side view of the conventional vertical bushing of FIG. 1.
Figure 3:
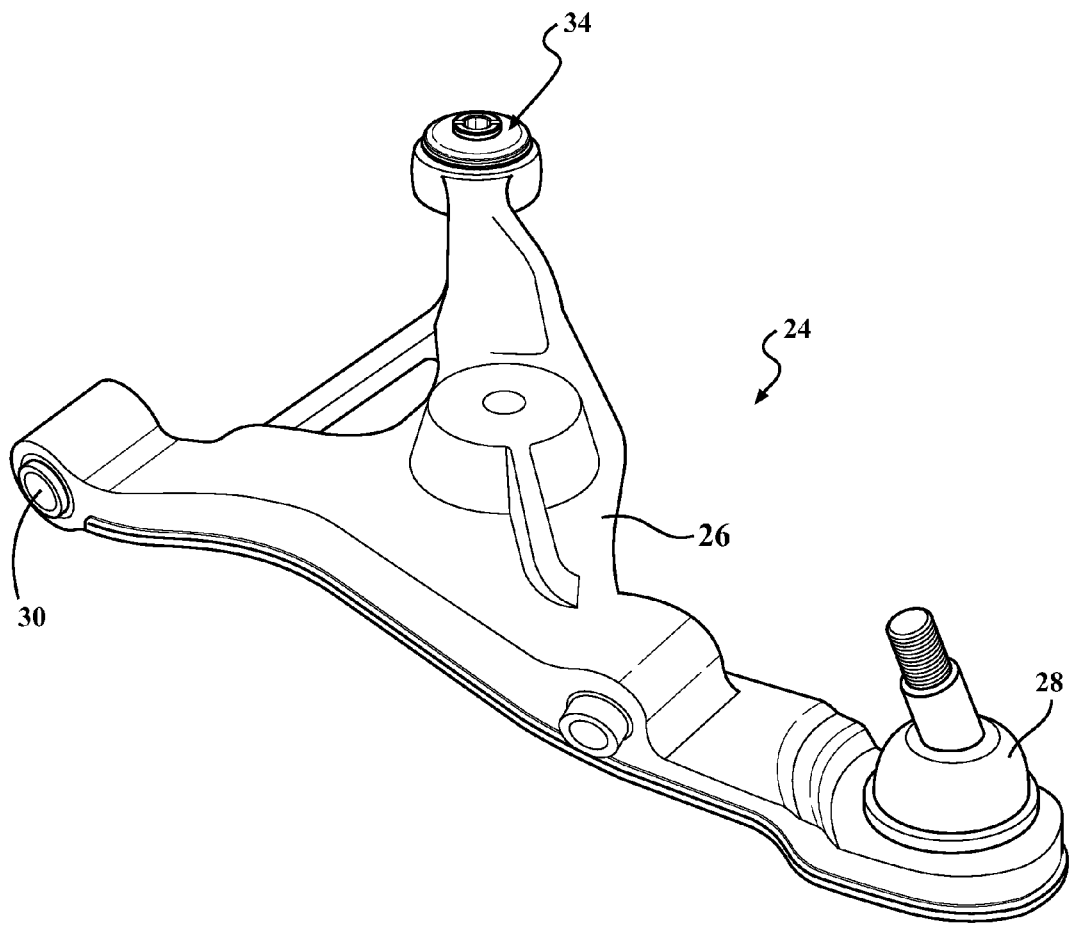
FIG. 3 is a perspective elevation view of a control arm including a first exemplary embodiment of a vertical socket.
Figure 4:
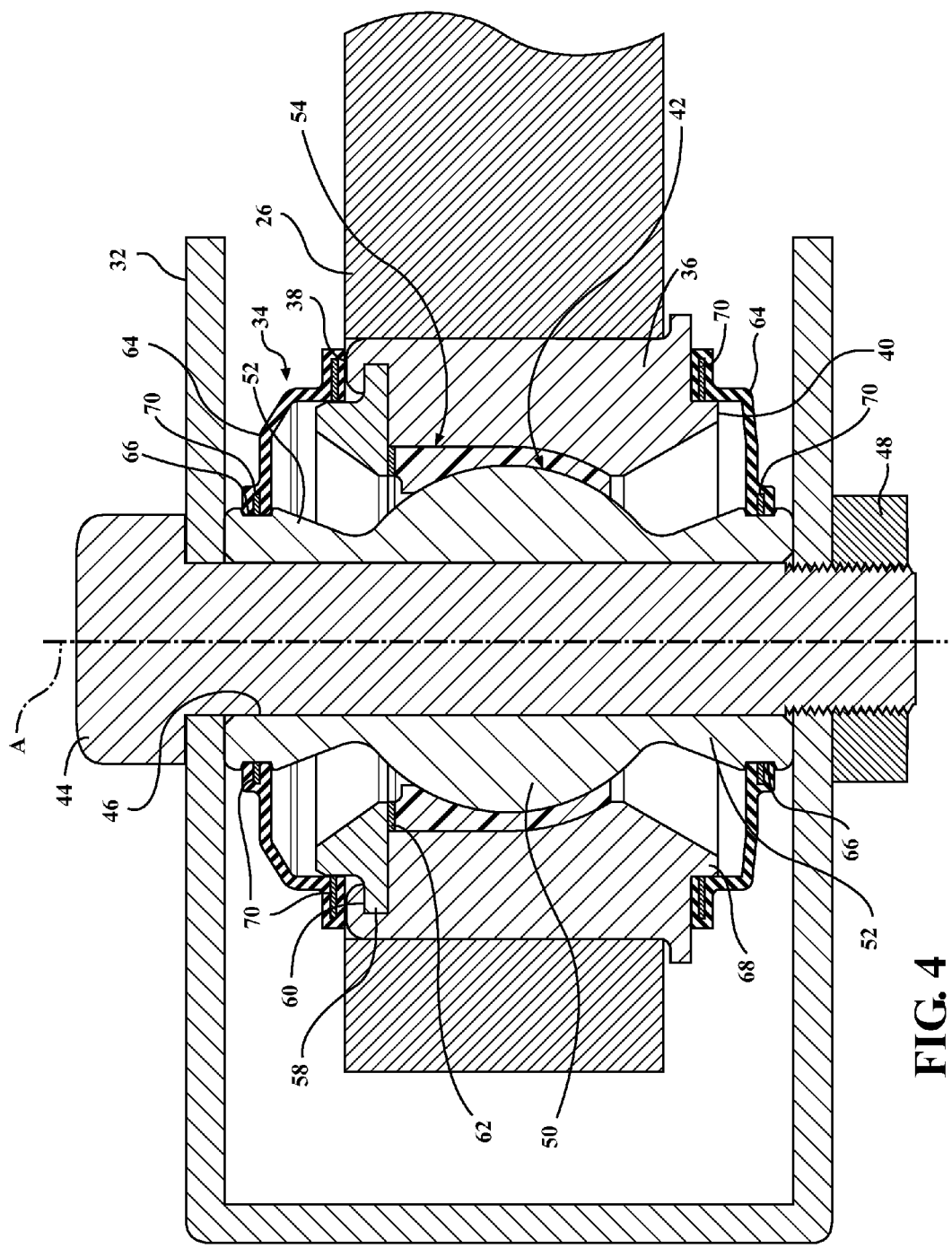
FIG. 4 is a cross-sectional view of the first exemplary embodiment of the vertical socket coupled to a vehicle frame and a control arm body.
Figure 5:
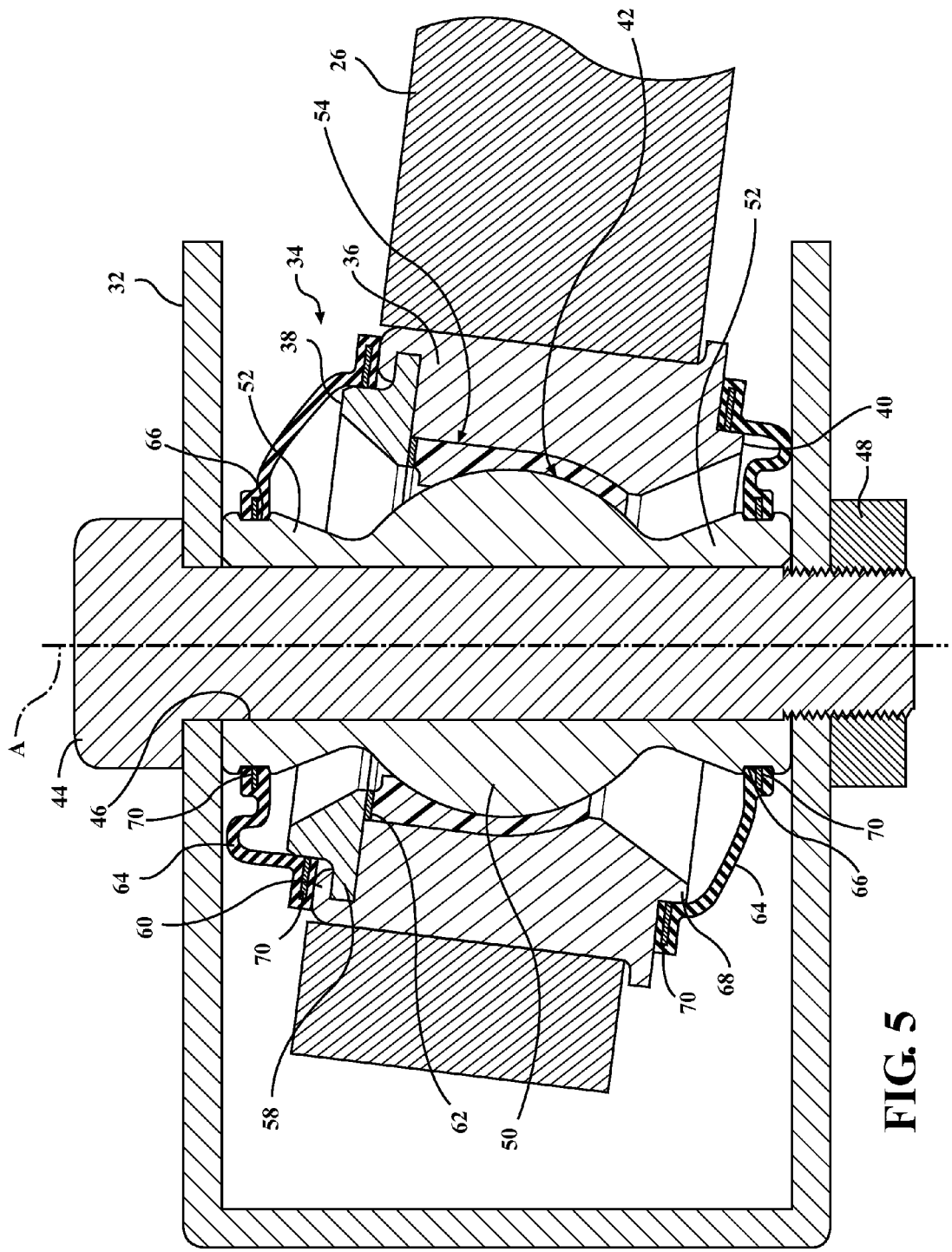
FIG. 5 is another cross-sectional view of the first exemplary embodiment of the vertical socket and illustrating the control arm body being pivoted or twisted in one direction.
Figure 6:
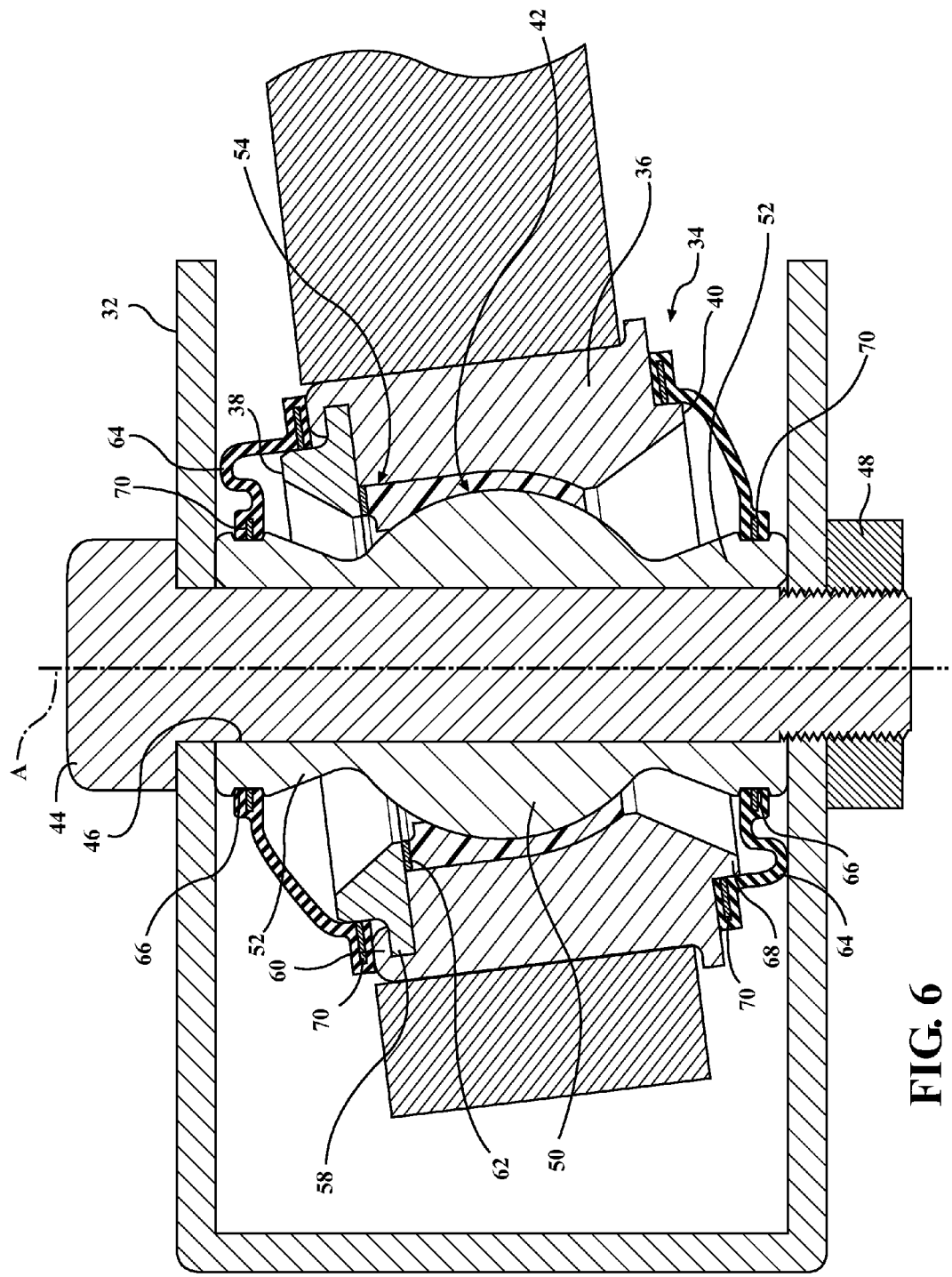
FIG. 6 is yet another cross-sectional view of the first exemplary embodiment of the vertical socket and illustrating the control arm body being pivoted or twisted in an opposite direction.

Referring to the Figures, wherein like numerals indicate corresponding parts throughout the several views, an exemplary control arm 24 for use in a vehicle suspension is generally shown in FIG. 3. The control arm 24 is configured for use in a range of different types of vehicle suspensions including, for example, MacPherson strut suspensions or double wishbone suspensions. The exemplary control arm 24 includes a control arm body 26, a connector 28 (such as a ball joint) for attachment to a wheel assembly (not shown); a horizontal bushing 30 which extends in a longitudinal direction for joining the control arm body 26 with a vehicle frame 32 (shown in FIG. 4); and a vertical socket 34 which extends in a vertical direction for also joining the control arm body 26 with the vehicle frame 32. Referring to FIGS. 4-6, during operation of the vehicle suspension, the vertical socket 34 and the horizontal bushing 30 (shown in FIG. 3) allow the control arm body 26 to rotate relative to the vehicle frame 32 when, for example, the wheel assembly encounters a pot hole or an obstacle in the road to maintain a tire on the wheel assembly in engagement with the road and also to provide a more comfortable ride for any passengers within the vehicle.

Referring still to FIGS. 4-6, a first exemplary embodiment of the vertical socket 34 is shown in engagement with a control arm body 26 and a vehicle frame 32. The exemplary vertical socket 34 includes a housing 36 which is press fit into an opening in the control arm body 26. The housing 36 could be of any desirable metal including, for example, steel or an aluminum alloy. The housing 36 has an inner bore that extends along a vertical axis A between an open upper end 38 and an open lower end 40. The vertical socket 34 also includes a stud 42 which extends axially through the inner bore of the housing 36 and past the housing's 36 upper and lower ends 40. As shown, the stud 42 is in engagement with the vehicle frame 32 both above and below the housing 36. More precisely, in the first exemplary embodiment, the stud 42 is joined with the vehicle frame 32 through a bolt 44 which extends through an axially extending passage 46 in the stud 42 and a nut 48, which is joined to the bolt 44. However, it should be appreciated that the stud 42 could alternately be attached with the frame 32 through any suitable fastening means. During normal operation of the suspension system, the bolt 44 fixes the stud 42 relative to the vehicle frame 32 while the control arm body 26 and the metal housing 36 pivot upwardly and downwardly relative to the frame 32 and the stud 42. This movement of the control arm body 26 and the metal housing 36 is depicted in FIGS. 5 and 6. The stud 42 may be formed of any suitable metal, such as heat treated (for improved wear resistance) SAE alloy steel.

The exemplary stud 42 includes a rounded central portion 50 and a pair of generally frustoconical end portions 52 disposed on either axial side of the rounded central portion 50. The outer surface of the rounded central portion 50 is generally semi-spherically shaped. A bearing 54 is disposed within the inner bore of the housing 36 and slidably engages rounded central portion 50 of the stud 42 to permit the rotational movement of the housing 36 and the control arm body 26 relative to the stud 42. Specifically, the bearing 54 has a curved inner surface with a curvature that generally matches the curvature on the central portion 50 of the stud 42 to provide a slidable interface between these components. The bearing 54 may be formed of a metal, a carbon fiber polymer, an engineering polymer or any suitable material that provides a low friction interface between the stud 42 and the bearing 54. Grease, or any other lubricant, may also be included in the inner bore of the housing 36 to further reduce friction between the stud 42 and bearing 54.

Figure 7:
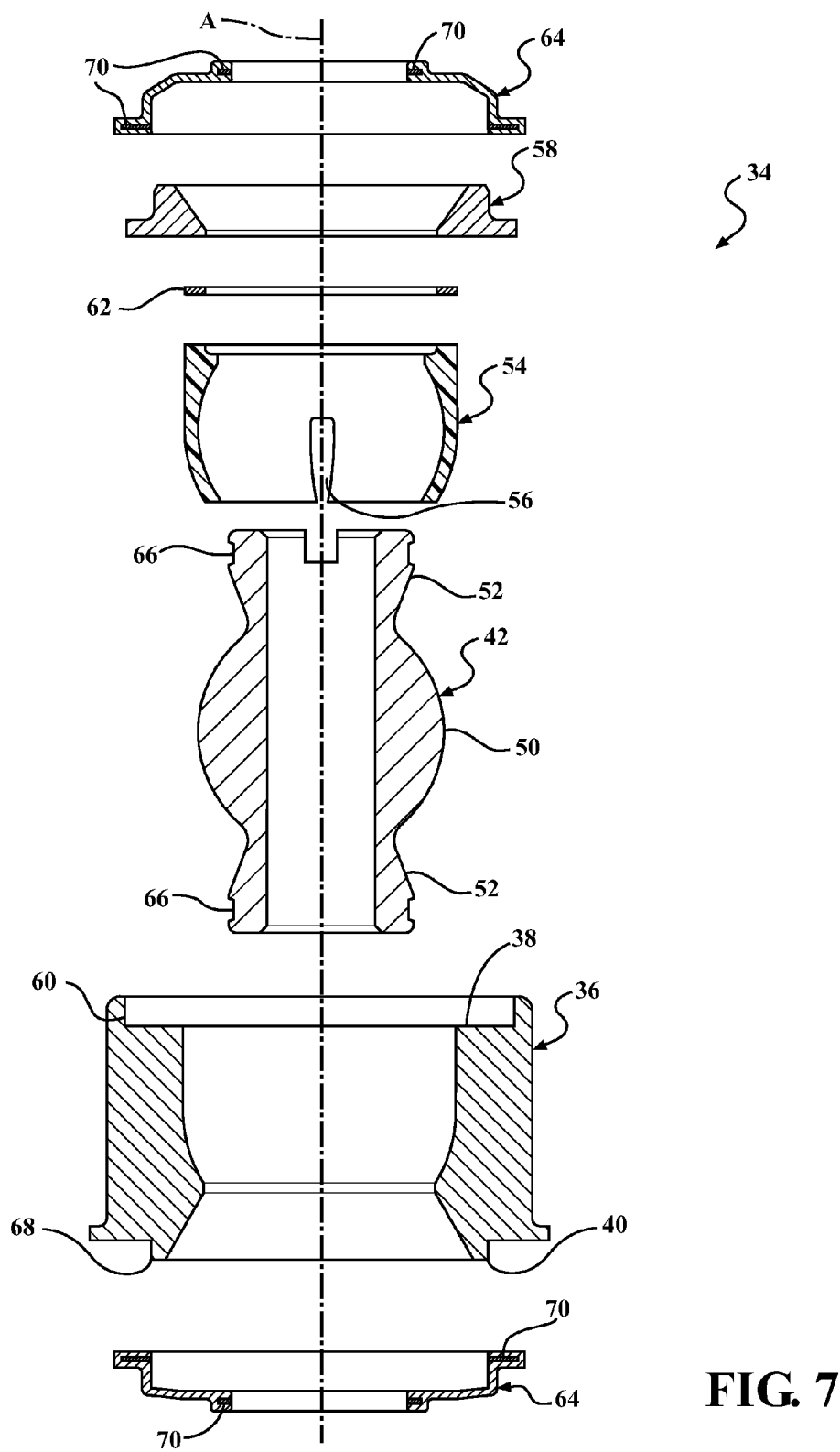
FIG. 7 is an exploded view of the first exemplary embodiment of the vertical socket

In the first exemplary embodiment of the vertical socket 34, the bearing 54 is a one piece snap over bearing 54 and engages the curved middle portion of the stud 42 both vertically above and below its equator. As best shown in FIG. 7, the bearing 54 of the first exemplary embodiment includes a plurality of slots 56 which allow the bearing 54 to be snapped onto the rounded central portion 50 of the stud 42. The slots 56 also function as channels for carrying grease to lubricate the contact surface between the stud 42 and the bearing 54.

Referring back to FIGS. 4-6, the vertical socket 34 of the first exemplary embodiment additionally includes a retainer member 58, or a cover plate, which is disposed adjacent the upper open end 38 of the housing 36 and retains the bearing 54 within the inner bore of the housing 36. Specifically, in the first exemplary embodiment of the vertical socket 34, the bearing 54 is trapped on one axial side by a curved feature in the housing 36 itself and on the other axial side by the retainer member 58. A projection 60 on the housing 36 is bent inwardly to engage a flange on the retainer member 58, thereby holding the retainer member 58 and the bearing 54 within the inner bore of the housing 36. It should be appreciated that the retainer member 58 could be engaged with the housing 36 through any suitable connection including, for example, spinning, crimping or a threaded connection.

In the first exemplary embodiment, a spring 62 is disposed axially between the retainer member 58 and the bearing 54 to bias the bearing 54 towards the lower end 40 of the housing 36. The spring 62 is preferably a Belleville washer 62 (also known as a washer spring 62) but any suitable type of spring 62 may alternately be employed including, for example, an O-ring or a rubber cushion. The spring 62 allows for improved tolerances during the manufacture and assembly of the vertical socket 34.

The retainer member 58 and the open lower end 40 of the housing 36, which is the end that is opposite of the retainer member 58, are both chamfered so that the openings on each end of the inner bore are generally frustoconically shaped. The frustoconical end portions 52 of the stud 42 and the chamfered surfaces on the housing 36 and retainer member 58 allows for the pivotal movement of the housing 36 and the control arm body 26 relative to the stud 42 and the vehicle frame 32.

The first exemplary embodiment of the vertical socket 34 further includes a pair of boots 64 of an elastomeric material. One of the boots 64 is sealed against a groove 66 located adjacent one end of the stud 42 and an axially extending flange 68 at the lower end 40 of the housing 36. The other boot 64 is sealed against a groove 66 on the opposite end of the stud 42 and an outer surface of the retainer member 58. Each boot 64 has a pair of metal inserts 70 overmolded at least partially within it for establishing press-fit engagements against the respective components to which it is sealed. The boots 64 maintain the grease or lubricant in contact with the rounded central portion 50 of the stud 42 and the bearing 54 and also keep debris and other contaminants away from the internal components of the vertical socket 34.

Figure 8:
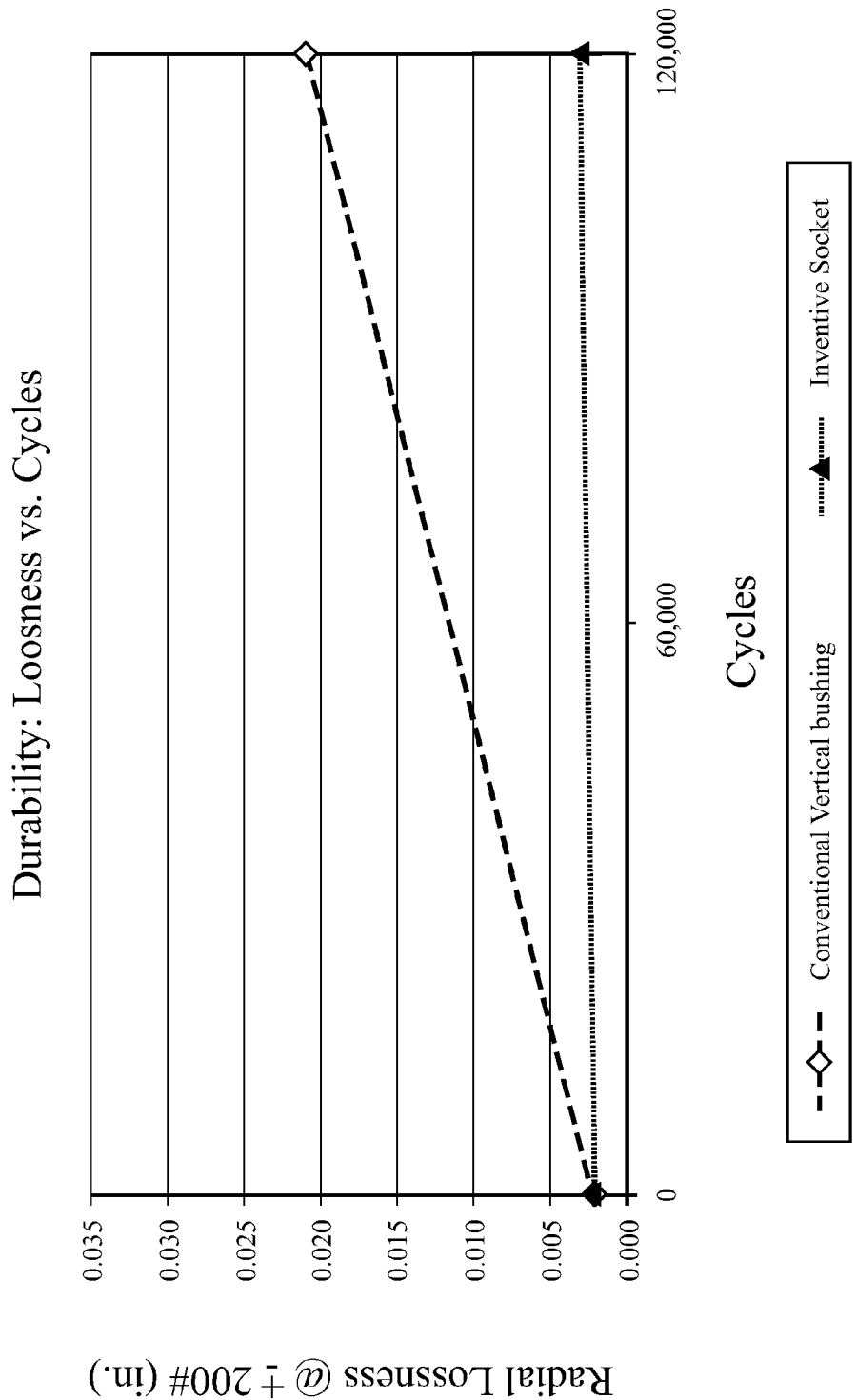
FIG. 8 is a chart illustrating the performance of the first exemplary embodiment in comparison to a conventional vertical bushing.

In operation, rotational movement and radial loading of the housing 36 relative to the stud 42 does little or no damage to the vertical socket 34, thus providing the vertical socket 34 with improved durability and operating life as compared to other known vertical bushings. The first exemplary embodiment of the vertical socket 34 has been found to last approximately 10 times longer than conventional vertical socket with little to no loss in performance. For example, the test results shown in FIG. 8 illustrate that the vertical socket 34 of the first exemplary embodiment may provide exceptional operational performance for one million cycles or more without failure, whereas the conventional vertical bushing of FIGS. 1 and 2A-C typically fails at around 100,000 cycles. The vertical socket 34 also allows for the transfer of radial forces from the control arm body 26 to the vehicle frame 32.

To assemble the first exemplary embodiment of the vertical socket 34, the bearing 54 is preferably engaged with the rounded central portion 50 of the stud 42 first, and then these components are inserted into the inner bore of the housing 36. Then, with the bearing 54 in place, then a Belleville washer 62 positioned on an upper surface of the bearing 54. Next, the retainer member 58 is positioned on top of the Belleville washer 62 such that the Belleville washer 62 is sandwiched axially between the retainer member 58 and the bearing 54. The retainer member 58 could alternately be placed directly on the upper surface of the bearing 54 if no Belleville washer 62 is included. A projection 60 on the housing 36 is then bent, or mechanically deformed, radially inwardly to secure the retainer member 58, Belleville washer 62 (if included) and bearing 54 all within the inner bore of the housing 36. The boots 64 are then sealed against their respective components. The vertical socket 34 may then be press fit into an opening of a control arm body 26 and attached to a vehicle frame 32 and a wheel assembly.

Figure 9:
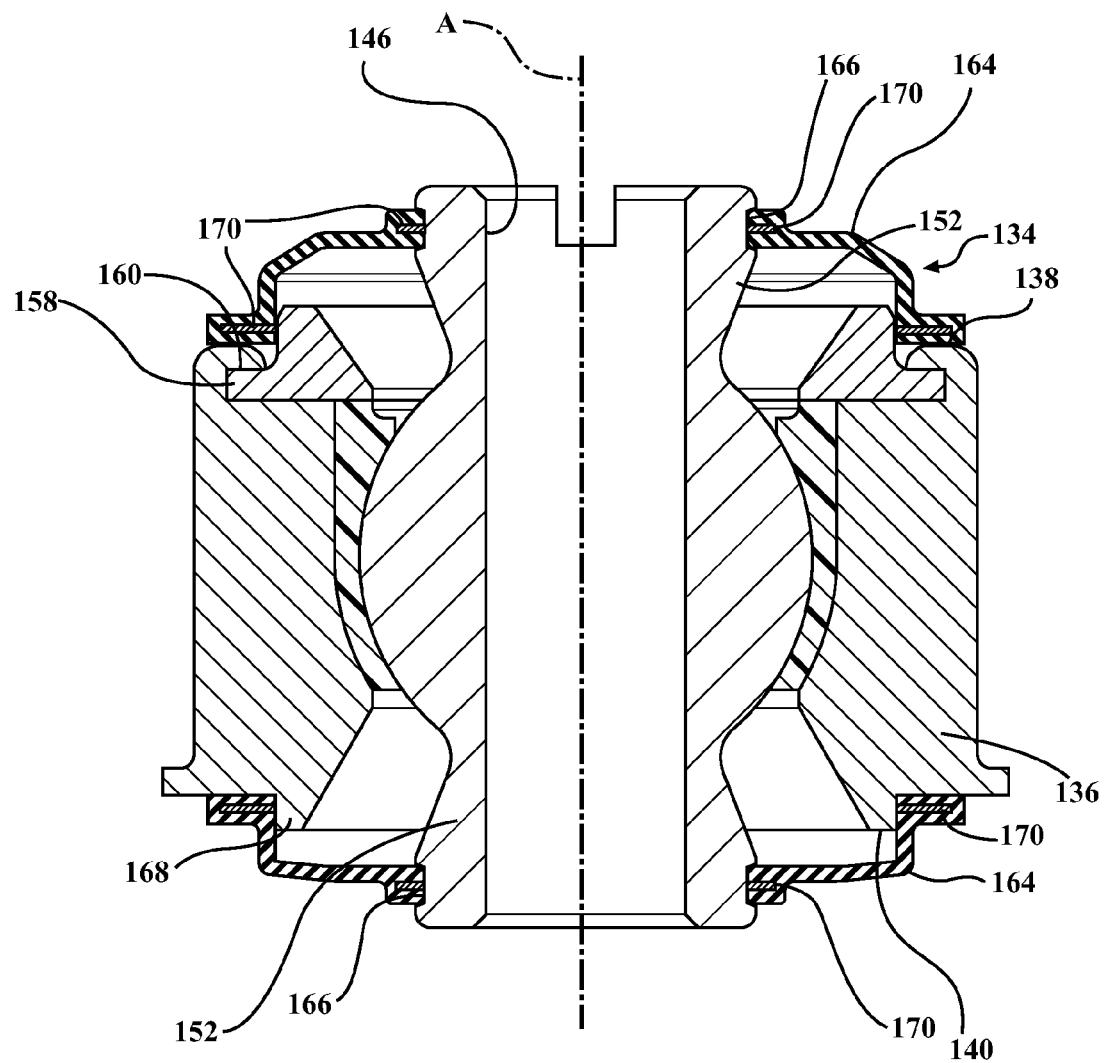
FIG. 9 is a cross-sectional view of a second exemplary embodiment of the vertical socket.

A second exemplary embodiment of the vertical socket 134 is generally shown in FIG. 9 with like numerals, separated by a factor of 100, being used to show features corresponding to the first exemplary embodiment discussed above. The second exemplary embodiment is similar to the first exemplary embodiment of the vertical socket 34 discussed above but lacks the Belleville washer 62. Rather, in the second exemplary embodiment, the retainer member 158 is engaged directly with the upper surface of the bearing 142.

Figure 10:
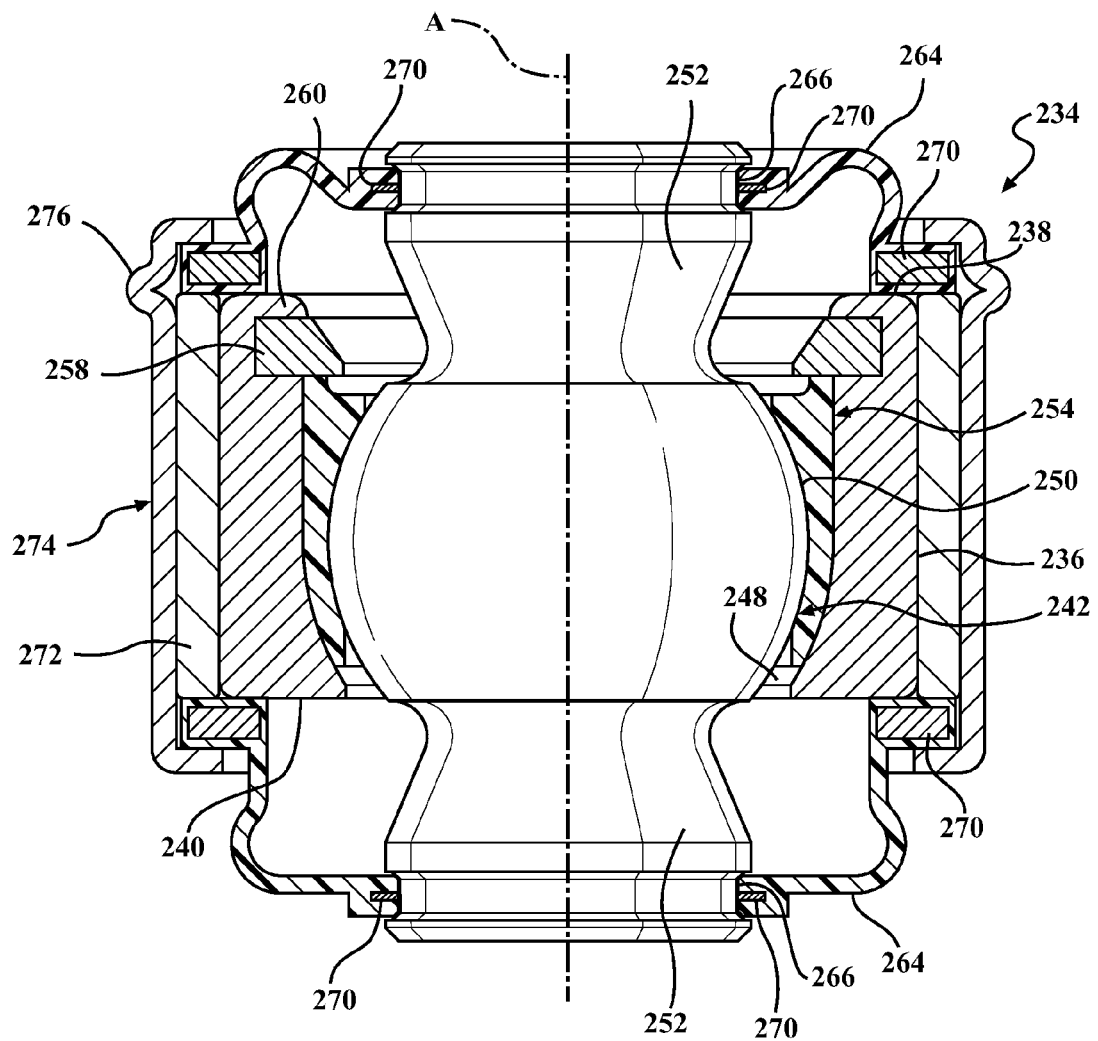
FIG. 10 is a cross-sectional view of a second exemplary embodiment of the vertical socket.

A third exemplary embodiment of the vertical socket 234 is generally shown in FIG. 10 with like numerals, separated by a factor of 200, being used to show features corresponding to the first exemplary embodiment discussed above. In this exemplary embodiment, a rubber cushion 272 which has a generally cylindrical shape is disposed about and substantially encircles the metal housing 236, and an outer shell 274 substantially encircles the rubber cushion 272. As such, in the third exemplary embodiment, the outer shell 274 is the radially outer-most component of the vertical socket 234. The outer shell 274 is sized to be press fit into an opening in a control arm body (such as the control arm body 26 of FIG. 3). In operation, the rubber cushion 272 absorbs radial forces between the control arm body and the vehicle frame. One end of each of the boots 264 is engagement with a groove 266 in the stud 242 and the other end of each boot 264 is sandwiched between a lip on the outer shell 274 and the rubber cushion 272. Additionally, the outer shell 274 includes a bead 276 formed therein which functions as a stopping point when inserting the vertical socket 234 into an opening in a control arm body. The rubber cushion 272 may be formed of any suitable elastomeric material, such as urethane rubber, and the outer shell 274 may be formed of any suitable metal, such as low carbon 1010 steel.

Figure 11:
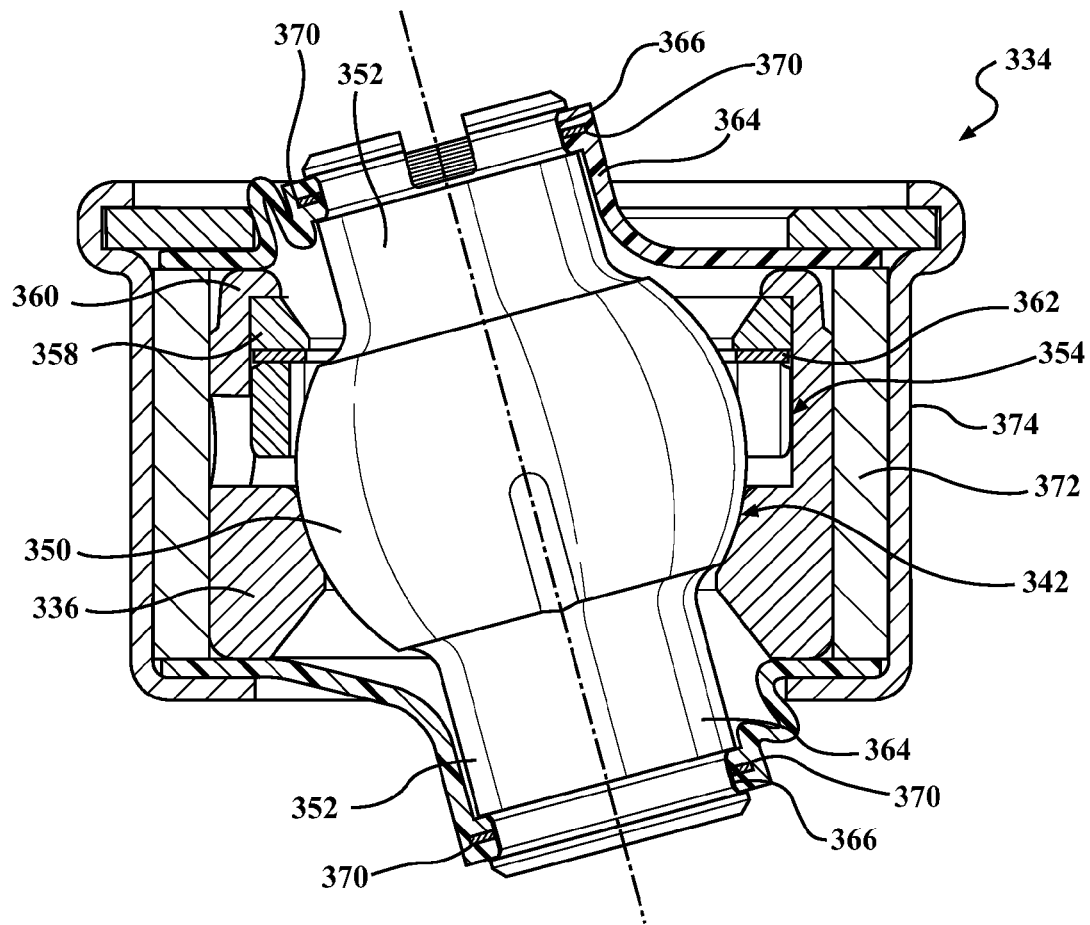
FIG. 11 is a cross-sectional view of a third exemplary embodiment of the vertical socket.

A fourth exemplary embodiment of the vertical socket 334 is generally shown in FIG. 11 with like numerals, separated by a factor of 300, being used to show features corresponding to the first exemplary embodiment discussed above. Like the third exemplary embodiment discussed above, the fourth exemplary embodiment includes a rubber cushion 372 and an outer shell 374. However, in this exemplary embodiment, the bearing 354 only engages an upper area of the curved middle portion 350 on the stud 342, and the housing 336 has a curved surface which slidably engages a lower area of the curved middle portion 350. As such, both the bearing 354 and the housing 336 are in sliding contact with the stud 342. The spring 362 thus applies a pre-load on the bearing 354 which translates that preload to the stud 354. In this exemplary embodiment, a washer 378 is disposed adjacent one end of the outer shell 374. Additionally, in this exemplary embodiment, the end portions 352 of the stud 342 are generally cylindrically, non frusto-conically, shaped.

Obviously, many modifications and variations of the present invention are possible in light of the above teachings and may be practiced otherwise than as specifically described while within the scope of the invention.

What is claimed is:

1. A control arm for a vehicle suspension, comprising:
    a control arm body having a connector for attachment to a wheel assembly and a horizontal bushing that extends in a longitudinal direction for coupling said control arm body with a vehicle frame;
    a housing press-fit into an opening in said control arm body, said housing extending along a vertical axis between open first and second ends, and said housing having an inner bore which extends between said open first and second ends;
    a bearing disposed within said inner bore of said housing, said bearing having a curved inner surface;
    a retainer member in engagement with said housing and retaining said bearing within said inner bore of said housing;
    a stud extending through said inner bore of said housing past said open first and second ends for engaging the vehicle frame on opposite sides of said housing, and said stud having a curved outer surface in sliding engagement with said curved inner surface of said bearing for allowing rotational movement of said housing and said control arm body relative to said stud and the vehicle frame; and
    a spring disposed axially between said bearing and said retainer member.

2. The control arm as set forth in claim 1 wherein one end of said housing is bent radially inwardly to engage said retainer member.

3. The control arm as set forth in claim 1 wherein said curved outer surface on said stud is semi-spherically shaped.

4. The control arm as set forth in claim 1 wherein said stud has a passage extending axially therethrough to receive a fastener for coupling said stud with the vehicle frame.

5. The control arm as set forth in claim 4 wherein said fastener is a bolt.

6. The control arm as set forth in claim 1 wherein said housing is of metal.

7. The control arm as set forth in claim 1 further including a cushion of an elastomeric material substantially circumferentially surrounding said metal housing and a metal shell substantially circumferentially surrounding said cushion.

8. The control arm as set forth in claim 1 wherein said retainer member is chamfered on a side opposite of said bearing for promoting said rotational movement of said housing relative to said stud and wherein the one of said open ends of said housing opposite of said retainer member is chamfered for further promoting said rotational movement of said housing relative to said stud.

9. A control arm for a vehicle suspension, comprising:
    a control arm body having a connector for attachment to a wheel assembly and a horizontal bushing that extends in a longitudinal direction for coupling said control arm body with a vehicle frame;
    a housing press-fit into an opening in said control arm body, said housing extending along a vertical axis between open first and second ends, and said housing having an inner bore which extends between said open first and second ends;
    a bearing disposed within said inner bore of said housing, said bearing having a curved inner surface;
    a retainer member in engagement with said housing and retaining said bearing within said inner bore of said housing;
    a stud extending through said inner bore of said housing past said open first and second ends for engaging the vehicle frame on opposite sides of said housing, and said stud having a curved outer surface in sliding engagement with said curved inner surface of said bearing for allowing rotational movement of said housing and said control arm body relative to said stud and the vehicle frame; and wherein said housing has an inner surface that is at least partially curved and in sliding contact with said curved outer surface of said stud.

10. A method of making a control arm for a vehicle suspension, comprising:

slidably coupling a curved inner surface of a bearing with a curved outer surface of an axially extending stud to allow rotational movement of the bearing relative to the stud;

positioning the bearing in an inner bore of a housing having axially spaced open ends such that the stud extends past the housing through the opposite open ends to allow rotational movement of the housing relative to the stud;

engaging a retainer member with the housing and the bearing to retain the bearing within the inner bore of the housing;

press fitting the housing into an opening in the control arm body such that the inner bore extends in the vertical direction to allow rotational movement of the control arm body relative to the stud; and positioning a spring in the inner bore of the housing between the bearing and the retainer member.

11. The method as set forth in claim 10 further including the step of deforming a portion of the housing to engage the retainer member.

* * * * *